July 19, 1960  J. J. SIGMAN, JR., ET AL  2,945,425

METHOD AND APPARATUS FOR DEBURRING GEARS

Filed Oct. 30, 1956

*INVENTORS*
JOHN J. SIGMAN JR.
WARREN C. McNABB
BY HENRY O. VERSCHAEVE

Whittemore-Hulbert
& Belknap  ATTORNEYS 2,945,425
Patented July 19, 1960

2,945,425
METHOD AND APPARATUS FOR DEBURRING GEARS

John J. Sigman, Jr., and Warren C. McNabb, Detroit, and Henry O. Verschaeve, St. Clair Shores, Mich., assignors to National Broach & Machine Company, Detroit, Mich., a corporation of Michigan Filed Oct. 30, 1956, Ser. No. 619,234

5 Claims. (Cl. 90—1.6)

The present invention relates to a method and apparatus for deburring gears and in some cases chamfering the top side edge of gear teeth.

Gear finishing operations such for example as gear shaving, are adapted to machine the sides or flanks of gear teeth throughout the active profile and up to the top edge of the teeth. However, such operations are ineffective to remove burrs thrown up above the crest of the thread and lying within the extended profile of the gear teeth. In fact, certain gear finishing operations if carried out under severe conditions, may in some cases cause a burr of this type to occur.

It is desirable to provide a deburring operation and preferably one which may be carried out during a gear finishing operation such for example as a gear shaving operation.

It is accordingly an object of the present invention to provide a tool of gear-like form adapted to be run in mesh with a gear so as to remove burrs at the crests of the teeth of the gear.

More specifically, it is an object of the present invention to provide a tool of the character described adapted to be rolled in mesh with a gear during a gear finishing operation such as a gear shaving operation, so as to remove the burr as it is formed.

Still more specifically, it is an object of the present invention to provide a deburring tool of toothed gear-like form having cutting ribs located adjacent the bottoms of the tooth spaces.

Still more specifically, it is an object of the present invention to provide a tool of the character described in the preceding paragraph provided with oppositely facing circumferentially spaced pairs of cutting edges adjacent the bottom of each tooth space in position to engage the crests of a work gear rotated in mesh therewith.

It is a further object of the present invention to provide a tool as described in the preceding paragraph in which the cutting edges are formed on rib structure provided with vertical radial clearance between each pair of cutting edges.

Other objects and features of the invention will become apparent as the description proceeds, especially when taken in conjunction with the accompanying drawings, wherein.

Figure 2:
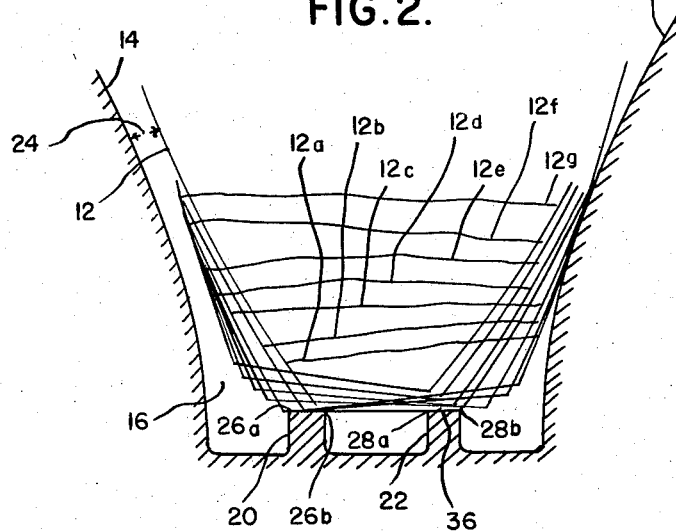
Figure 2 is a greatly enlarged diagrammatic view showing the relationship between a tooth of a gear and the cutting edges provided between adjacent teeth of the tool in several sequential positions.

For a particular gear, the gear-like tool 10 is designed with substantial backlash or clearance between its teeth and the teeth 12 of the gear 11. Thus, in Figure 2, a tooth 12 of the gear is shown as contacting the surface of the tooth 14 at the right, and substantial clearance designated 24 is illustrated as existing at the left hand side of the tooth 12.

The ribs 20 and 22 extend across the width of the tool in circumferentially spaced relation longitudinally of the bottoms of each tooth space 16 and they are provided with cutting edges 26a, 26b and 28a, 28b respectively.

Figure 3:
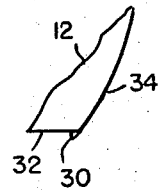
Figure 3 is a fragmentary portion of a gear tooth showing the burr thereon.
Figure 1:
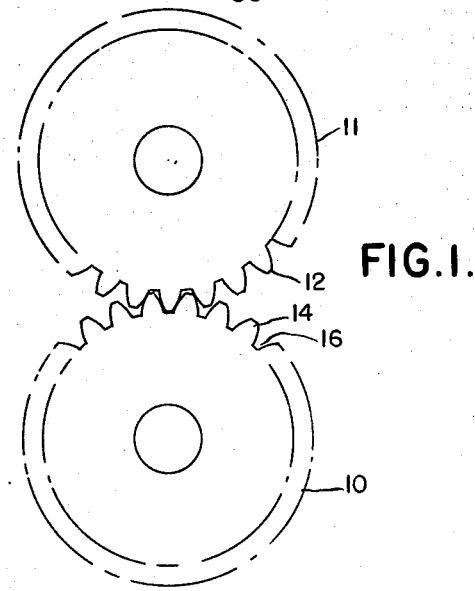
Figure 1 is an elevational view of a work gear and deburring tool in operating engagement.

A number of sequential positions of the tooth 12 are designated at 12a, 12b, 12c, 12d, 12e, 12f, and 12g. The operation is intended to remove a burr such as illustrated at 30 in Figure 3, the burr being located to extend beyond the crest 32 of the tooth at the edge provided by the intersection between the crest 32 and the flank 34, and located inwardly beyond the extension of the ordinarily involute flank surface 34. In order to remove this burr the rib 22 is provided with the sharp cutting edges 28a and 28b which are defined by the intersection between the top surface 36 of the rib and the side surfaces thereof.

The action during meshed rotation of the gear and tool in one direction results in removal of a burr at both sides of the teeth of the gear, although some action at opposite sides is somewhat different. Assuming that rotation of the gear and tool, portions of which are illustrated in Figure 2, is such as to cause the illustrated portions to move to the left as seen in Figure 2, it will be observed that the lower right hand corner of the gear teeth traces a curved path which approaches the deburring cutting edge 28b. The lower left hand corner of gear tooth 12 traverses the cutting edge 26b. To carry out the deburring operation the gear and deburring tool are radially adjusted relative to each other to bring the crests of the teeth of the gear into proper relationship to the cutting edges and the parts are thereafter rotated. If the gear and deburring tool are properly adjusted, the deburring cutter will remove the burr without performing any chamfering operation. However, if the radial spacing between the gear and tool is reduced slightly, the cutting edges of the ribs 20 and 22 remove material from the top land of the gear teeth at the corners.

Reverse rotation between the gear and tool will result in a corresponding deburring action by the cutting edges 26a, 28a. It will be appreciated that during reverse rotation, the backlash or clearance between the teeth of the gear and tool is transferred to the opposite sides thereof. Backlash is provided primarily to permit resharpening by grinding the top surfaces of ribs 20 and 22, the top surface of rib 22 being designated 36.

Figure 4:
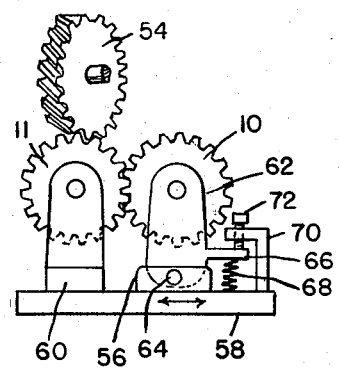
Figure 4 is a diagrammatic view illustrating the deburring tool in mesh with a work gear during a gear finishing operation.

Referring now to Figure 4 there is illustrated an important feature of the present invention which combines operation of the deburring tool 10 with the work gear 11 while the work gear is being shaved by a shaving cutter 54. In this figure the shaving cutter 54 is diagrammatically illustrated as designed for performing a gear finishing operation known as crossed axes shaving, which is commonly employed in the production of high accuracy gears. In some cases, although the shaving operation normally takes place at relatively small pressures, it may nevertheless cause a burr to be thrown up at the crests of the teeth of the shaved gear. In accordance with the present invention the gear 11, while it is being shaved by the shaving cutter 54, is maintained in meshed relation with the deburring tool 10. In this case, as in the operation previously described, the deburring tool is designed to have substantial clearance or backlash with respect to the teeth of the gear and is accurately adjusted radially thereof to the proper position in which the top side corners of its teeth follow the proper path with reference to the deburring cutting edges, such as illustrated at 26a, 26b and 28a, 28b in Figure 2. In Figure 4 the means for providing this accurate radial adjustment is diagrammatically illustrated as comprising an adjustable slide 56 which is adjustable on a table 58 which carries supports 60 for the gear 11. Thus, if the gear 11 has motions imparted to it during the shaving operations, specifically by moving the table 58, the deburring tool 10 partakes of these motions and remains at all times in proper deburring position and relationship with respect to the gear 11.

As seen in Figure 4, the deburring tool 10 may be mounted on a post 62 which is pivoted as indicated at 64 to the slide 56. The post 62 is shown as provided with a laterally extending arm 66 the underside of which is engaged by a compression spring 68 urging the post counterclockwise in a direction to move the deburring tool 10 toward the work gear 11. A bracket 70 is provided having an adjustable abutment screw 72 which limits such rocking movement of the post 62. With this arrangement the position of the deburring tool 10 may be accurately adjusted, and at the same time there is provision for yielding movement of the deburring tool 10 away from the gear 12 if necessary to prevent damage to the tool.

Actual rotation of the gear, the shaving cutter and the deburring tool may be accomplished by directly rotating either the gear 11 or the shaving cutter 54, as is well understood in the art.

Inasmuch as the deburring tool is in constant mesh with its axis parallel to the axis of the gear, it operates to contact the teeth of the gear continuously from end to end and accordingly will remove the burr as it may be thrown up progressively by the action of the shaving cutter 54.

It may be mentioned at this time that the shaving operation is carried out with the axis of the gear and shaving cutter crossed in space, and to distribute the shaving action longitudinally from end to end of the gear, relative traverse is provided between the gear and shaving cutter in a plane parallel to the axes of both the gear and shaving cutter and in a direction in such plane as will cause the common normal to the axes of the gear and shaving cutter to move progressively from one side to the other of the gear. Thus, the burr on the teeth of the gear, if produced by the shaving operation, is formed progressively from one end of the teeth to the other. The deburring tool, which rotates in mesh with the gear with their axes parallel, is thus effective to remove the burr as it is produced and is not required to perform its deburring operation simultaneously across the entire width of the teeth of the gear.

The drawings and the foregoing specification constitute a description of the improved method and apparatus for deburring gears in such full, clear, concise and exact terms as to enable any person skilled in the art to practice the invention, the scope of which is indicated by the appended claims.

What we claim as our invention is:

1. A tool for deburring the top side edges of the teeth of a gear comprising a toothed gear-like tool generally conjugate to the gear and having a pair of laterally spaced deburring ribs extending longitudinally of the bottoms of the spaces between its teeth in position to engage the top side edges of the gear teeth, each of said ribs having cutting edges at the intersection between its top and side surfaces.

2. A tool for deburring the top side edges of the teeth of a gear comprising a toothed gear-like tool generally conjugate to the gear and having a pair of laterally spaced deburring ribs extending longitudinally of the bottoms of the spaces between its teeth in position to engage the top side edges of the gear teeth, said tool having teeth designed to provide substantial backlash with the teeth of the gear when meshed to operating depth, each of said ribs having cutting edges at the intersection between its top and side surfaces, said ribs being spaced to provide deburring by corresponding sides of adjacent ribs when the tool is rotated in mesh with the gear in one direction, and to provide deburring by the other sides of the ribs when rotated in the other direction.

3. The method of removing burrs from the crests of gear teeth which comprises rotating the gear in mesh with a gear-like tool having a pair of circumferentially spaced ribs each provided with oppositely directed cutting edges located adjacent the bottom of the tooth spaces of the cutter.

4. The method of finishing a gear which comprises rotating the gear in mesh with a gear-like shaving cutter with the axes of the gear and cutter crossed in space, providing a relative traverse between the gear and shaving cutter in a plane parallel to the axes of both the gear and shaving cutter and in a direction in such plane as to cause the common normal to the axes thereof to move progressively from one side to the other of the gear and simultaneously maintaining a deburring tool having a pair of deburring cutting edges extending longitudinally of the bottom of each of the tooth spaces thereof in mesh with the gear with the axes of the gear and deburring tool parallel, the teeth of the deburring tool and gear having substantial backlash, and reversing the direction of rotation of the gear, shaving cutter and deburring tool.

5. The method of finishing a gear comprising rotating the gear in mesh with a gear-like shaving cutter with the axes of the gear and cutter crossed in spaced, effecting a relative back and forth traverse between the gear and cutter in a plane parallel to the axes of the gear and cutter and in a direction in such plane as to cause the common normal to said axes to move progressively across the width of the gear, maintaining a gear-like deburring tool in loose mesh at fixed center distance with the gear, the deburring tool having a pair of oppositely directed longitudinally extending spaced cutting edges adjacent the bottom of each of its tooth spaces in position to engage the top side edges of the teeth of a gear, maintaining the gear and deburring cutter with substantial backlash between the teeth thereof and at a constant radial spacing to provide the required deburring operation, and reversing the direction of rotation of the gear, shaving cutter, and deburring tool upon reversal of the direction of the relative traverse between the gear and shaving cutter.

References Cited in the file of this patent

UNITED STATES PATENTS

| | | |
|---|---|---|
| 2,270,831 | Drummond | Jan. 20, 1942 |
| 2,278,300 | Barter et al. | Mar. 31, 1942 |
| 2,392,803 | Austin | Jan. 15, 1946 |
| 2,683,399 | Dodge | July 13, 1954 |